Nov. 20, 1956 — C. B. FISCHER — 2,771,524
SPEED ALARM

Filed March 30, 1954 — 2 Sheets-Sheet 1

Carl B. Fischer
INVENTOR.

Nov. 20, 1956     C. B. FISCHER     2,771,524
SPEED ALARM
Filed March 30, 1954     2 Sheets-Sheet 2
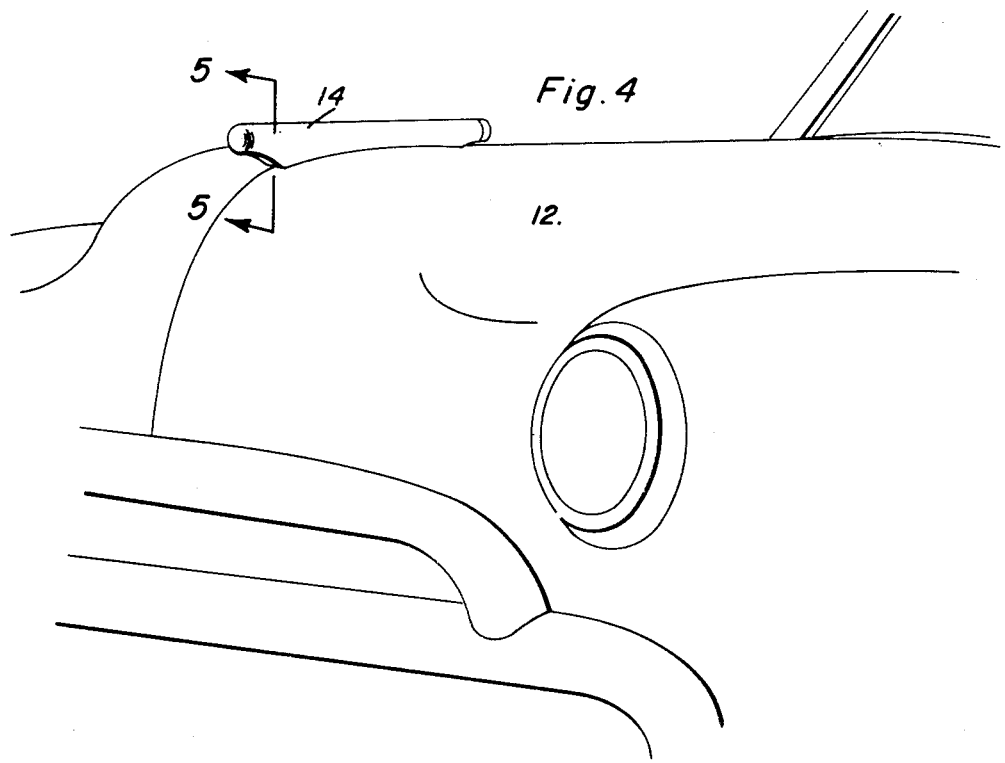
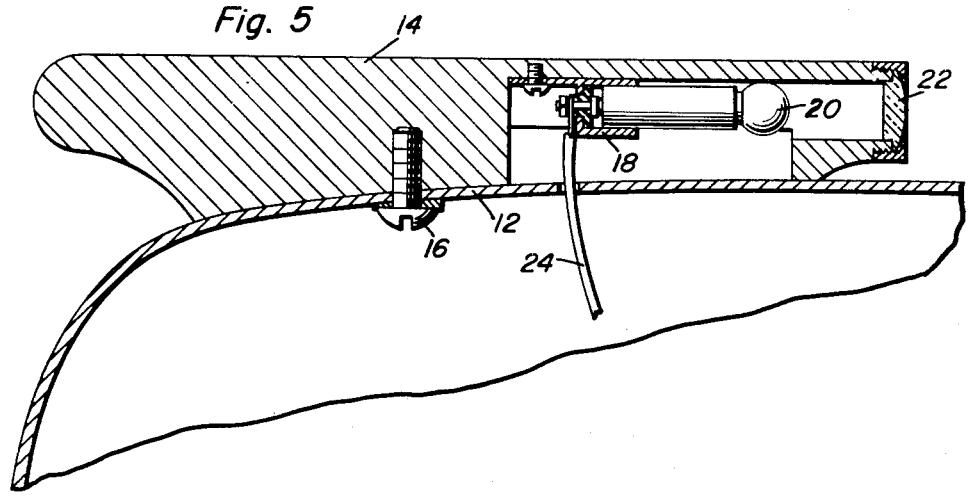
Carl B. Fischer
INVENTOR.

United States Patent Office 2,771,524
Patented Nov. 20, 1956

2,771,524

SPEED ALARM

Carl B. Fischer, Los Angeles, Calif.

Application March 30, 1954, Serial No. 419,697

2 Claims. (Cl. 200—56)

This invention relates to a visual signalling apparatus adapted to be associated with an automobile or other similar motor vehicle, and more particularly to a device adapted to be mounted on the hood of a vehicle and actuated by a novel device associated with the speedometer of the vehicle.

The primary object of this invention resides in the provision of visual alarm for warning the operator of a vehicle that he has exceeded a safe rate of travel without requiring the operator to remove his eyes from the road ahead of him thereby increasing the safety of operation of the motor vehicle.

A further object of this invention resides in the provision of a novel actuating device adapted to be associated with the speedometer indicator in such a manner that movement of the speedometer indicator past a certain indicated speed will automatically cause a lamp mounted on the front of the hood of the vehicle and in the normal line of sight of the operator to be turned on thus providing a warning to the operator of the vehicle of the rate at which he is travelling without requiring the operator to inspect the speedometer.

The construction of this invention features a novel actuation device including a casing adapted to be associated with the speedometer housing of the vehicle. Mounted in the casing is a switch handle which is adapted to be engaged by the speedometer indicator. The switch handle includes a resilient contact adapted to seat in one of a pair of concave seats provided therefore. Springs are associated with the seats and overlie a portion of them so as to provide means for continuously urging the switch handle into a position where it may be contacted by the speedometer indicator yet which is adapted to yield so that the speedometer indicator may pass over the switch handle when being moved in a particular direction.

Still further objects and features of this invention reside in the provision of a novel speed alarm for use with automobiles and other motor vehicles that is strong and durable in construction, and manufacture, capable of being installed on various existing types, models, and makes of vehicles, yet which is easy to install and inexpensive to produce and thereby permitting wide distribution.

These, together with the various ancillary objects and features of the invention which will become apparent as the following description proceeds, are attained by this speed alarm, a preferred embodiment of which has been illustrated in the accompanying drawings, by way of example only, wherein:

Figure 4 is a perspective view illustrating the construction of the visual signalling device; and Figure 5 is a vertical sectional view as taken along the plane of line 5—5 of Figure 4.

Figure 1:
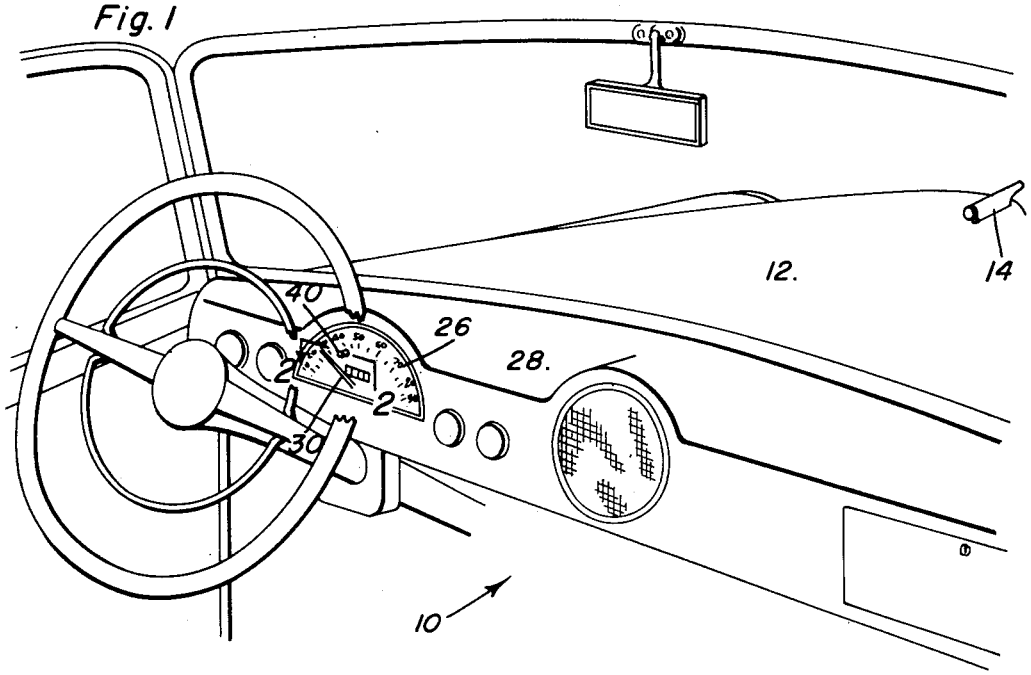
Figure 1 is a perspective view illustrating the visual signal device as mounted on the hood of a vehicle and further illustrating the switch handle and speedometer with which the switch handle is associated.

With continuing reference to the accompanying drawings wherein like reference numerals designate similar parts throughout the various views, reference numeral 10 generally designates an automotive vehicle on which this apparatus is adapted to be installed. The vehicle 10 is provided with a hood 12 on which a visual signalling device 14 is installed. The visual signalling device 14 is preferably associated with the nose ornament of the vehicle 10 and may form a part thereof. This nose ornament may be in the form of a transparent or translucent casing which is secured by any suitable fastener as at 16 to the hood 12. Within the rear portion of the casing is mounted a lamp socket 18 for support of an electric lamp 20. A removable lens 22 or other transparent and light transmitting member closes the nose ornament 14 so as to provide protection for the lamp 20 from inclement weather. Further, the light emanating from the lamp 20 can either be diffused or directed by the member 22 so as to be readily perceivable by the operator of the vehicle while the operator of the vehicle is viewing the road ahead of him. Suitable electrical conductors 24 are of course connected to the switch housing 18 so as to operatively connect the lamp 20 with a suitable source of electrical power such as the battery and generator with which the vehicle is provided as is conventional.

In order to actuate the lamp 20 there is provided a novel actuating device adapted to be associated with the speedometer 26 of the vehicle which is mounted on the instrument panel 28. The speedometer 26 may be of a conventional device having a suitably operated indicator 30.

Figure 2:
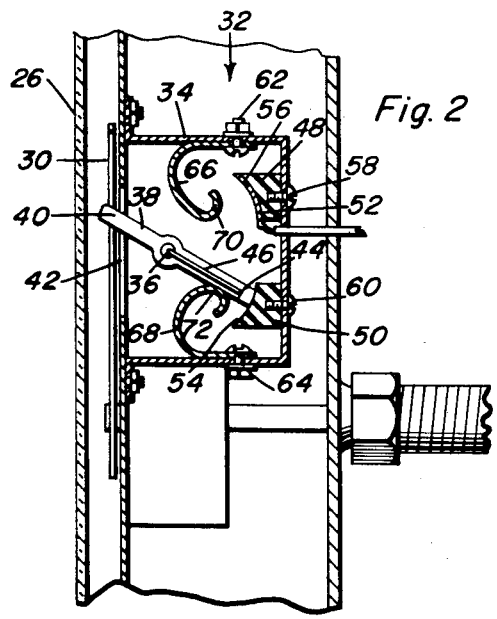
Figure 2 is a vertical sectional view as taken along the plane of line 2—2 in Figure 1 and being shown on an enlarged scale for greater clarity.
Figure 3:
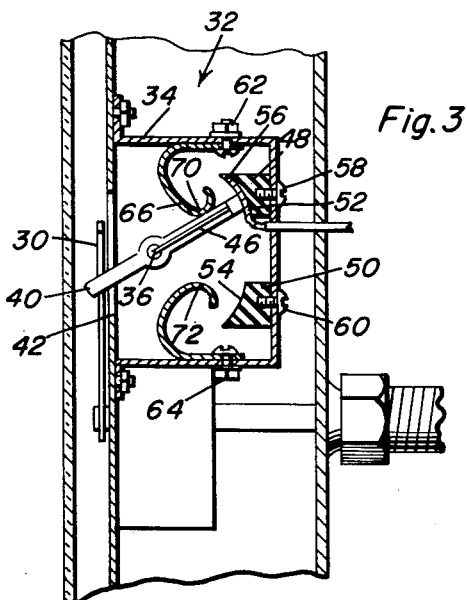
Figure 3 is a view similar to that of Figure 2 but showing the switch handle in a different position.

The actuating device comprising the present invention generally indicated by reference numeral 32 and which can be best seen in Figures 2 and 3 is adapted to be actuated by the indicator 30. This device includes a casing 34 secured within the instrument panel 28 and in association with the housing of the speedometer 26.

Mounted within the casing 34 in a rotatable manner on any suitable shaft or axle 36 is a switch handle 38 having one end 40 thereof which extends outwardly through a suitable slot-like opening 42 in the dial of the speedometer 26. The end 40 of the switch handle 38 is adapted to be engaged by the indicator when the indicator is moved through operation of the vehicle 10 at different rates of speed. The switch handle 38 has a resilient electrically conductive contact 44 at the end thereof opposite from the end portion 40. A suitable conductor 46 either embedded in the switch handle 38 or running therewith is adapted to operatively connect the contact 44 with the circuit which it controls.

Mounted within the casing 34 are a pair of resilient seats 48 and 50 having concave surfaces 52 and 54, respectively. An electrically conductive contact 56 is associated with the seat 48 and adapted to be engaged by the contact 44 to complete an operative electrical circuit from the source of electrical power to the lamp 20. The seats 48 and 50 may be formed from a suitable resilient rubber-like material or any other suitable substance. The seats 48 and 50 may be held in position by fasteners 58 and 60. Secured to the casing 34 by fasteners 62 and 64 are a pair of springs 66 and 68 which are arcuate in shape and have arcuate end portions 70 and 72 respectively which overlie to a considerable degree the seats 48 and 50. Hence, for example with the switch handle 38 in the position as is shown in Figure 2, should the indicator 30 contact the switch handle 38 it will urge the switch handle 38 to rotate so that the resilient contact 44 will engage the contact 56 on the seat 48. This will complete the operative electrical circuit and cause the lamp 20 to become excited. Should, however, the indicator 30 be driven due to the excessive rate of travel of the vehicle to the extent where it must pass over the switch handle 38 the resilient spring 70 will give sufficiently to permit such passage. Further, the spring 70 will urge the switch handle 38 outwardly to a position where the end 40 can again be engaged by the speedometer indicator 30 when the vehicle reduces its rate of speed.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. An actuation device adapted to be used with a hood mounted visual signal device and actuated by the indicator of a speedometer comprising a casing, a switch handle rotatably mounted in said casing and having an end portion extending outwardly of said casing for engagement by the speedometer indicator, a pair of opposed resilient seats in said casing, one of said seats being electrically conductive, and a resilient contact on said switch handle adapted to resiliently engage and seat in one of said seats when said switch handle is actuated by said indicator, and a pair of springs partially overlying said seats and engageable by said switch handle, said springs being stressed to permit said indicator to pass over said switch handle, said springs returning said switch handle into position for subsequent engagement by said indicator.

2. An actuation device adapted to be used with a hood mounted visual signal device and actuated by the indicator of a speedometer comprising a casing, a switch handle rotatably mounted in said casing and having an end portion extending outwardly of said casing for engagement by the speedometer indicator, a pair of opposed resilient seats in said casing, one of said seats being electrically conductive, and a resilient contact on said switch handle adapted to resiliently engage and seat in one of said seats when said switch handle is actuated by said indicator, said resilient contact when engaging said electrically conductive seat being adapted to complete an operative electrical circuit between said visual signal device and a source of electrical power, said seats being concave in shape for reception of said resilient contact, and a pair of springs partially overlying said seats and engageable by said switch handle, said springs being stressed to permit said indicator to pass over said switch handle, said springs returning said switch handle into position for subsequent engagement by said indicator.

References Cited in the file of this patent

UNITED STATES PATENTS

| | | |
|---|---|---|
| 2,082,535 | Bourdon | June 1, 1937 |
| 2,154,670 | Donaily | Apr. 18, 1939 |
| 2,511,503 | Greenberg | June 13, 1950 |
| 2,640,119 | Bradford | May 26, 1953 |